G. H. SCANLAN.
TRACTOR FORWARD AND REVERSE GEARING.
APPLICATION FILED MAY 15, 1919.
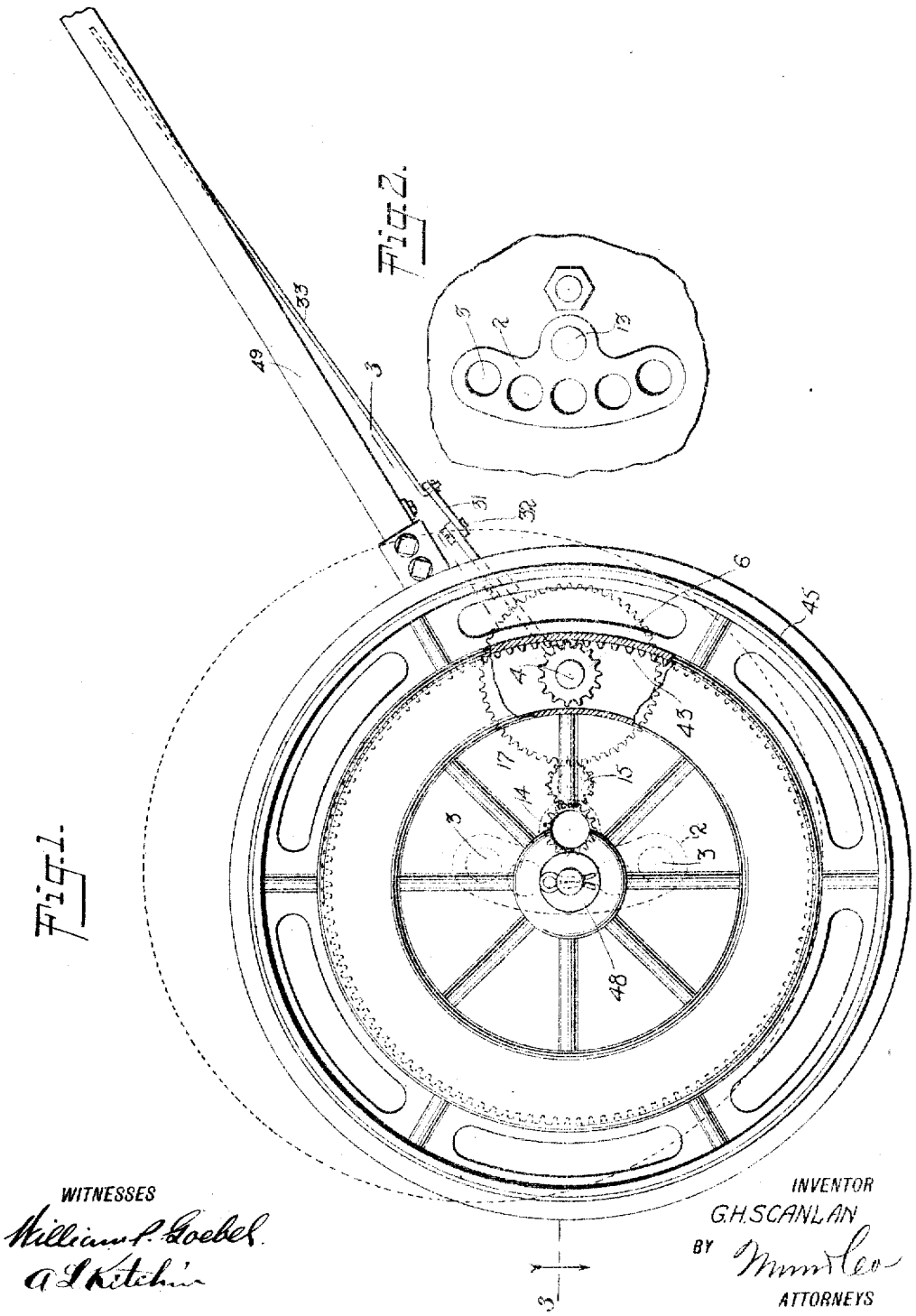

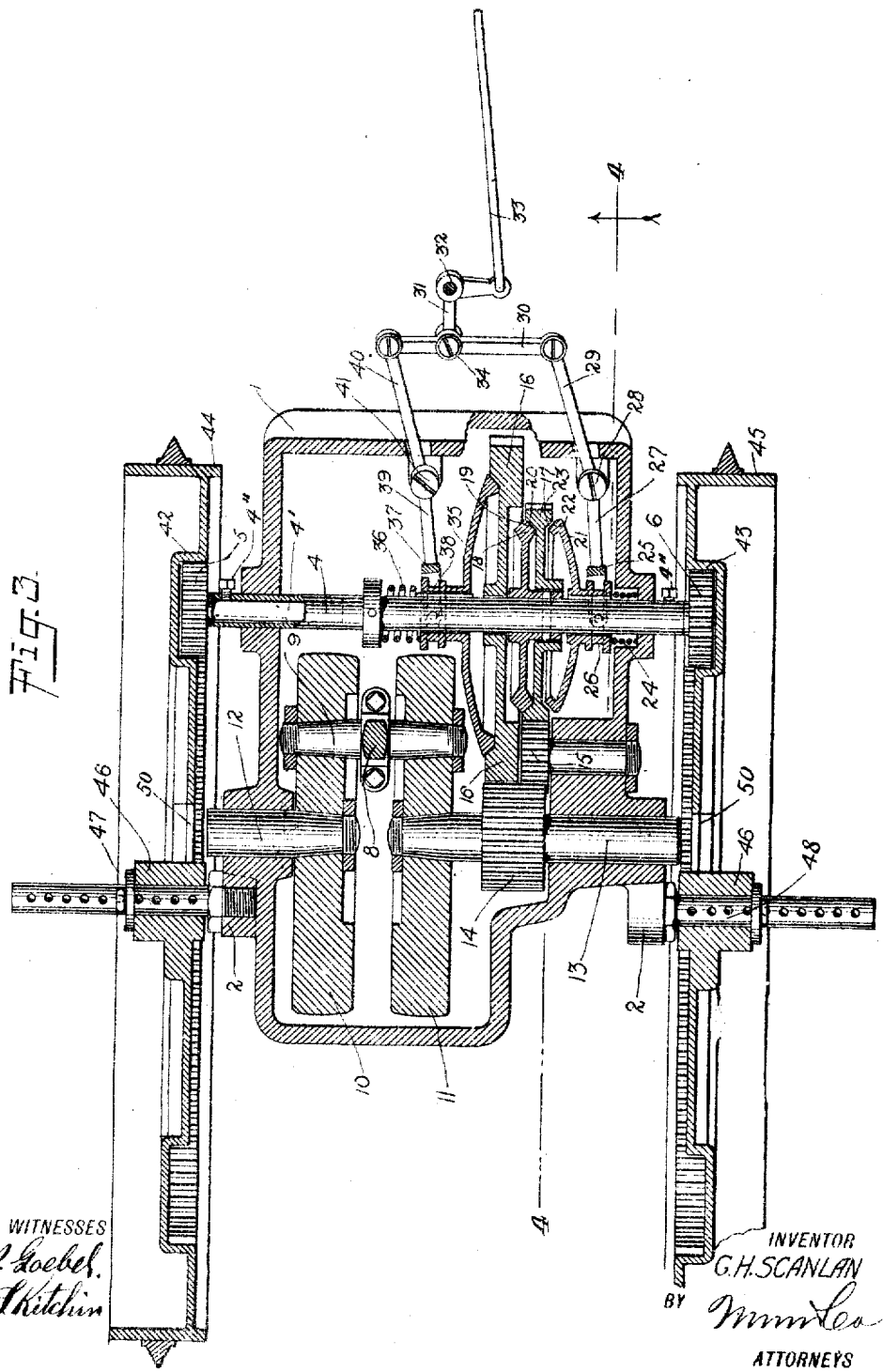

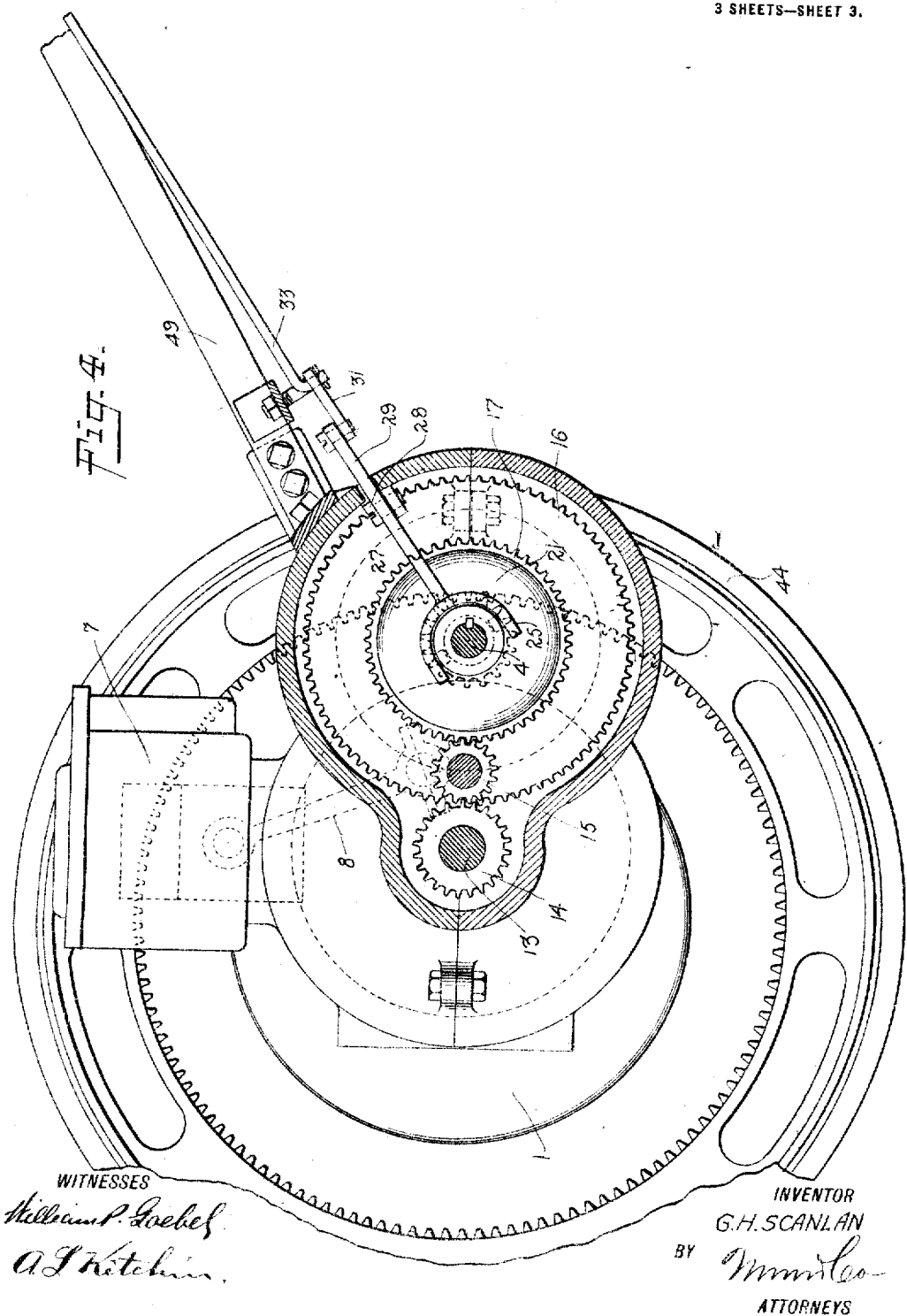

UNITED STATES PATENT OFFICE.

GEORGE H. SCANLAN, OF NEW YORK, N. Y.

TRACTOR FORWARD AND REVERSE GEARING.

1,359,109.   Specification of Letters Patent.   Patented Nov. 16, 1920.

Application filed May 15, 1919. Serial No. 297,299.

*To all whom it may concern:*

Be it known that I, GEORGE H. SCANLAN, a citizen of the United States, and a resident of the city of New York, borough of Manhattan, in the county and State of New York, have invented a new and Improved Tractor Forward and Reverse Gearing, of which the following is a full, clear, and exact description.

This invention relates to tractors and has for an object to provide an improved construction whereby the tractor may be reversed at any time.

Another object of the invention is to provide a tractor in which a simple effective reversing mechanism is provided which will be extremely small and simple in construction so as not to increase appreciably the size of the structure.

A still further object of the invention is to provide a structure in which the wheels may be adjusted so as to raise and lower the casing to comply with different requirements for general use.

Another object of the invention is to provide a construction which will not only permit an up and down adjustment of the casing in respect to the bull wheels and reversing mechanism, but also means whereby the bull wheels may be spaced different distances apart and yet remain connected up with the power.

In the accompanying drawings:

Figure 1 is a side view of a tractor embodying the invention, certain parts being broken away for illustrating a certain part of the driving mechanism.

Fig. 2 is a detail fragmentary side view showing a plurality of sockets arranged in an enlargement on the casing.

Fig. 3 is a horizontal section through the structure shown in Fig. 1.

Fig. 4 is a sectional view through Fig. 3 on line 4—4.

Referring to the accompanying drawings by numerals, 1 indicates a casing which is provided with an enlargement 2 on each side as shown in Fig. 3, which is provided with a number of apertures 3, the centers of these apertures being positioned on an arc struck from the center of the driving shaft 4. Driving shaft 4 is journaled in suitable bearings in the casing 1 and carries the driving pinions 5 and 6 at its ends. This shaft is driven by a suitable internal combustion engine 7 of preferably the four-cycle type, which may have one or more cylinders. The engine 7 has the connecting rod 8 thereof journaled on the pin 9 which connects the fly wheels 10 and 11. These fly wheels are rigidly secured to the shafts 12 and 13, shaft 12 being merely a stub shaft for holding the fly wheel 10 in place, while shaft 13 acts in the same capacity for fly wheel 11 and also carries the driving gear 14. As the engine rotates the shaft 13 will act as a power shaft and the gear 14 will continually rotate and also continually rotate the pinion 15 and gear wheel 16 as they continually mesh therewith. An auxiliary or reversing gear wheel 17 continually meshes with idler 15 so that it also rotates continually during the operation of the engine. The gear wheel 16 is loosely mounted on the shaft 4, while the auxiliary gear wheel 17 is loosely mounted on the hub of the clutch member 18, which clutch member is keyed or otherwise rigidly secured to shaft 4. It will be observed that this clutch member has a clutch surface 19 coacting with the clutching surface 20 of auxiliary gear wheel 17 so that when the gear wheel is pressed against the clutch member 18 a clutching action will take place. In order to cause this action a clutch-shoe 21 having a clutch surface 22 is moved over until the clutch surface engages the surface 23 of gear wheel 17. When the clutch shoe 21 presses against the gear wheel 17 sufficiently said gear and the clutch member 18 together with the shoe 21 will all rotate together and consequently will rotate shaft 4. It is to be understood that the clutch shoe 21 is splined on to the shaft 4 and is allowed to freely slide on the shaft though a spring 24 is provided for moving the clutch shoe toward the gear wheel 17 while a suitable yoke 25 engages the groove 26 in the hub of the shoe 21 so that power may be transmitted thereto for holding the clutch-shoe out of engagement with wheel 17. The yoke 25 is connected with an arm 27 pivotally mounted at 28, said arm having a projection 29 rigidly secured thereto, which arm is pivotally connected to the cross bar 30. A bell crank lever 31 is pivotally connected to the bar 30 and is in turn pivotally mounted at 32 so that whenever the rod 33 is pushed or pulled the bar 30 is moved longitudinally. The connection at 32 is preferably somewhat elongated so as to take care of the movement of the parts.

When the parts are in the position shown in Fig. 3 the clutch-shoe 21 is not operating and auxiliary gear wheel 17 is merely rotating idle by reason of the idler 15. To drive the tractor forward the main clutch-shoe 35 engages the gear wheel 16 as shown in Fig. 3, said main clutch-shoe being splined to the shaft 4 whereby when the contact between the shoe and the gear wheel is sufficient power may be directly transmitted to shaft 4 for driving the tractor in a forward direction. A spring 36 acts on the hub of the clutch-shoe 35 for giving said clutch shoe a tendency to always remain in engagement with the gear wheel 16. This clutch-shoe is moved out of engagement or held positively in engagement by the yoke 37 having an extension fitting into the groove 38, said yoke being operated by an arm 39 provided with an extension 40, said arm being pivoted at 41 on the casing. The extension 40 is pivotally connected with the bar 30 so that the clutch 35 will be thrown out of engagement when clutch 21 is thrown in. Any suitable catch may be connected with the rod 33 so as to lock either clutch shoe in engagement with the respective wheels 16 and 17. It will be noted that when the clutch 35 is locked in engagement with wheel 16 the tractor is moving forwardly and when the clutch shoe 21 is locked in engagement with the auxiliary gear wheel 17 the tractor is moving rearwardly on account of the arrangement of the idler 15.

Regardless of the direction of rotation of the shaft 4 power is transmitted therefrom through the pinions 5 and 6 to the racks 42 and 43 connected or formed integral with the bull wheels 44 and 45. These bull wheels may be of any size or shape without departing from the spirit of the invention and are each provided with a central hub 46 for receiving the respective shafts or axles 47 and 48. As the bull wheels and associated parts are identical the description of one will apply to both. From Fig. 1 it will be seen that the bull wheel 45 may be readily adjusted so as to raise and lower the casing 1. This is done by having the axle or shaft 48 fitting into any of the openings 3 on the enlargement 2 of the casing 1. From Figs. 1 and 2 it will be noted that the openings 3 are arranged on the arc of a circle, the center of which is the center of shaft 4. It is, of course, evident that other means of raising and lowering the wheel may be provided without departing from the spirit of the invention, as for instance the arrangement shown in my co-pending application, Serial No. 287,224. If desired the shaft 4 could be made longer and also the shafts 47 and 48 could be made longer so that the bull wheels could be set at a greater distance from the casing 1. In fact a set of shafts 4, 47 and 48 could be provided and substituted at any time so that the bull wheels may be spread apart or brought close together according to the circumstances and the desires of the person using the tractor.

Preferably the shaft 4 is made hollow and is provided with a telescoping or sliding auxiliary shaft 4' at each end to which the gear wheels 5 and 6 are rigidly secured, said auxiliary shaft being splined to shaft 4 and locked in any desired position by the respective set screws 4''. A similar arrangement could be provided on the axles of shafts 47 and 48, but preferably they are made as shown in Fig. 3 of the drawing whereby the bull wheels may be moved toward and from the casing as desired. In addition each bull wheel is provided with an opening 50 whereby either of the shafts 12 and 13 may be removed and longer shafts substituted, said longer shafts extending through the openings 50 and arranged to receive a pulley so that the device may be used as a power plant.

In operation, after the engine has been started the tractor may be guided by the handles 49 over any desired course. To apply the power so that the tractor will move forwardly the rod 33 is pushed toward the tractor whereupon the clutch member 35 is thrown into engagement with the gear wheel 16 and the engine will then begin to drive the bull wheels in a forward direction. If, for any reason, it is desired to stop the tractor without stopping the engine, rod 33 is pulled until clutch 35 is merely disengaged. If it should be desired to cause the tractor to move rearwardly the pull on rod 33 is continued until the clutch 21 is thrown into engagement with the auxiliary gear wheel 17 whereupon the engine will act through the idler 15 and associate parts for rotating shaft 4 in a reverse direction and consequently for rotating the bull wheels in a reverse direction. From this it will be seen that by the operation of one rod the tractor may be stopped or caused to move in either direction. It is, of course, evident that the tractor could be connected with a plow, cultivator, or any desired device without departing from the spirit of the invention.

What I claim is:

1. In a forward and reversing gear of the character described, a driving shaft, a driving gear loosely mounted on the driving shaft, a clutch splined to said shaft and movable toward and from said driving gear, a clutch member rigidly secured to said shaft, an auxiliary driving gear loosely mounted on said shaft, an auxiliary clutch adapted to be brought into contact with said auxiliary driving gear, a power shaft, a master gear secured to said power shaft and rotated thereby, said master gear continually meshing with the first mentioned driving gear, a pinion meshing with said master gear and also with the auxiliary driving gear, and means for shifting said clutches so that one will be in at a time.

2. In a forward and reversing gear of the character described, a power shaft, a master gear rigidly secured to the power shaft and rotated thereby, a driving shaft arranged parallel with the power shaft, a driving gear loosely mounted on the driving shaft and meshing with said master gear, a clutch splined on said driving shaft, means for moving the clutch to engage the driving gear whereby power will be transmitted to the driving shaft for rotating in one direction, a clutch member rigidly secured to said driving shaft, an auxiliary gear loosely mounted on said driving shaft and adapted to press against said clutch member, an idle pinion meshing with said master gear and with the auxiliary driving gear, an auxiliary clutch splined on said driving shaft, and means for moving said auxiliary clutch so that it will press against said auxiliary driving gear and press the same against said clutch member whereby power is transmitted to said driving shaft in a reverse direction.

3. In a reversing gear of the character described comprising a driving shaft, a reversing mechanism therefor, said reversing mechanism comprising a driving gear and an auxiliary driving gear, both loosely mounted upon the driving shaft, an independent clutch mounted on said driving shaft for each of said gears, means for moving said clutches into and out of operation, a master gear continually meshing with said driving gear, and an idle pinion continually meshing with said master gear and said auxiliary gear.

4. In a reversing gear of the character described comprising a master gear, a driving gear meshing therewith, an idler meshing with said master gear, an auxiliary gear meshing with the idler, a driving shaft extending loosely through said driving gear, means for connecting and disconnecting said driving gear with said shaft so that they will rotate together, a clutch member rigidly secured to said driving shaft arranged adjacent said auxiliary gear, and a clutch splined to said driving shaft capable of forcing said auxiliary gear against said clutch member whereby rotary motion of the auxiliary gear will be transmitted to the clutch member and from thence to the shaft for rotating the same in a reverse direction from the direction in which the first mentioned gear acts.

5. In a reversing gear of the character described, a master gear, a driving shaft, a driving gear meshing with said master gear, and loosely mounted on the driving shaft, an auxiliary driving gear loosely mounted on the driving shaft, an idler meshing continually with the master gear and continually with said auxiliary gear, a clutch splined on said shaft for said driving gear, a second clutch splined on said shaft for the auxiliary driving gear, and a single actuated member for simultaneously throwing one clutch out as the other is thrown in whereby the driving shaft may be reversed in its direction of movement at any time.

6. In a reversing gear of the character described a master driving gear, a driving shaft, a pair of loosely mounted gear wheels mounted on said driving shaft, said gear wheels being of different diameters and one gear wheel continually meshing with said master gear, an idler pinion continually meshing with said master gear and with one of the sliding gears on said driving shaft, a sliding clutch member for each of said gears, and a single operated mechanism for simultaneously operating said clutches so that one clutch is thrown out substantially at the same time the other is thrown in whereby said driving shaft may operate in different directions.

7. In a reversing gear mechanism of the character described, a power shaft, a master gear connected with said power shaft and rotated thereby, a driving shaft arranged parallel to the power shaft, a clutch member rigidly secured to said driving shaft, a driving gear loosely mounted on said driving shaft and continually meshing with said master gear, an auxiliary gear loosely mounted on said driving shaft, an idler pinion continually meshing with said master gear and said auxiliary gear whereby both said driving gear and said auxiliary gear are continually rotating when said master gear is rotating, and means for quickly connecting and disconnecting either of said gears with said driving shaft, said means causing the gears to press against said clutch member.

8. In a reversing gear mechanism of the character described, a power shaft, a master gear connected with said power shaft and rotated thereby, a driving shaft arranged parallel to the power shaft, a driving gear loosely mounted on said driving shaft and continually meshing with said master gear, an auxiliary gear loosely mounted on said driving shaft, an idler pinion continually meshing with said master gear and said auxiliary gear whereby both said driving gear and said auxiliary gear are continually rotating when said master gear is rotating, and means for quickly connecting and disconnecting either of said gears with said driving shaft.

GEORGE H. SCANLAN.